(12) United States Patent
Paulraj

(10) Patent No.: US 7,916,694 B2
(45) Date of Patent: Mar. 29, 2011

(54) METHOD AND SYSTEM REDUCING PEAK TO AVERAGE POWER RATIO (PAPR) IN A COMMUNICATION NETWORK

(75) Inventor: Arogyaswami Paulraj, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 933 days.

(21) Appl. No.: 11/368,961

(22) Filed: Mar. 6, 2006

(65) Prior Publication Data

US 2007/0019537 A1 Jan. 25, 2007

Related U.S. Application Data

(60) Provisional application No. 60/700,767, filed on Jul. 19, 2005.

(51) Int. Cl.
*H04B 7/208* (2006.01)

(52) U.S. Cl. .................. 370/330; 370/344; 455/131

(58) Field of Classification Search .................. 370/203, 370/343, 330, 344; 375/260, 259, 267, 297 375/359, 296; 455/131
See application file for complete search history.

(56) References Cited

U.S. PATENT DOCUMENTS

| | | | | |
|---|---|---|---|---|
| 5,634,199 A * | 5/1997 | Gerlach et al. | ................ | 455/63.1 |
| 6,377,539 B1 * | 4/2002 | Kang et al. | ................... | 370/209 |
| 6,438,389 B1 * | 8/2002 | Sandhu et al. | ............. | 455/562.1 |
| 7,184,490 B1 * | 2/2007 | Rybicki et al. | ................ | 375/297 |
| RE40,322 E * | 5/2008 | Williams | ....................... | 324/620 |
| 7,466,759 B2 * | 12/2008 | Vummintala et al. | ......... | 375/267 |
| 7,580,466 B2 * | 8/2009 | Ido | ................ | 375/260 |
| 7,586,997 B2 * | 9/2009 | Vummintala et al. | ......... | 375/299 |
| 7,680,212 B2 * | 3/2010 | Vu et al. | ......................... | 375/299 |
| 7,706,335 B2 * | 4/2010 | Garrett et al. | ................. | 370/336 |
| 7,764,658 B2 * | 7/2010 | Garrett et al. | ................. | 370/336 |
| 7,787,564 B1 * | 8/2010 | Anvari | ........................ | 375/297 |
| 2002/0168013 A1 * | 11/2002 | Attallah et al. | ................ | 375/259 |
| 2004/0179627 A1 * | 9/2004 | Ketchum et al. | ............... | 375/267 |
| 2007/0019537 A1 * | 1/2007 | Paulraj | .......................... | 370/203 |
| 2007/0036231 A1 * | 2/2007 | Ido | ................. | 375/260 |
| 2008/0273641 A1 * | 11/2008 | Yang et al. | .................... | 375/359 |
| 2009/0022240 A1 * | 1/2009 | Rybicki et al. | ................. | 375/297 |
| 2009/0092203 A1 * | 4/2009 | Yu | ................. | 375/296 |
| 2009/0279639 A1 * | 11/2009 | Saed | ............................ | 375/296 |
| 2010/0080312 A1 * | 4/2010 | Moffatt et al. | ................. | 375/260 |
| 2010/0166086 A1 * | 7/2010 | Zhou | ............................ | 375/260 |
| 2010/0239033 A1 * | 9/2010 | Shiue et al. | ................... | 375/260 |
| 2010/0272197 A1 * | 10/2010 | Har et al. | ...................... | 375/260 |

(Continued)

OTHER PUBLICATIONS

Petre et al., Mulitcarrier Block-Spread CDMA for Broadband Cellular Downlink, 2004, EURASIP Journal on Applied Signal Processing 2004:10, 1568-1564.*

(Continued)

*Primary Examiner* — Salman Ahmed
(74) *Attorney, Agent, or Firm* — McAndrews, Held & Malloy, Ltd.

(57) ABSTRACT

A method and system of transmitting a plurality of Orthogonal Frequency Division Multiple (OFDM) symbols in a block transmission system of a communication network is provided. The block transmission system is a frequency reuse system. The method includes encoding the plurality of OFDM symbols. The method further includes, modulating at least one of a phase and a magnitude of the plurality of OFDM symbols. Thereafter, a plurality of modulated OFDM symbols is converted from a digital form to an analog form. The plurality of modulated OFDM symbols corresponds to the plurality of OFDM symbols.

12 Claims, 6 Drawing Sheets

U.S. PATENT DOCUMENTS

2010/0284478 A1* 11/2010 Liao et al. ............... 375/260
2010/0310017 A1* 12/2010 Atungsiri ............... 375/340

OTHER PUBLICATIONS

Armstrong, Peak-to-average power reduction for OFDM by repeated clipping and frequency domain filtering, Feb. 2002, Electronics Letters, vol. 38 No. 5, 246-247.*

Langton, Orthogonal Frequency Division Multiplex (OFDM) Tutorial, 2004, Intutive Guide to Principles of Communications, 1-21.*

Spectrum and waveform relations of multicarrier communications; Military Communications Conference, 1996. MILCOM '96, Conference Proceedings, IEEE Issue Date: Oct. 21-24, 1996.*

Adaptive redundant residue number system coded multicarrier modulation; Keller, T.; Liew, T.H.; Lajos Hanzo; Selected Areas in Communications, IEEE Journal on vol. 18 , Issue: 11 Digital Object Identifier: 10.1109/49.895034 Publication Year: 2000.*

Broadband OFDM using 16-bit precision on a SDR platform; This paper appears in: Military Communications Conference, 2001. MILCOM 2001. Communications for Network-Centric Operations: Creating the Information Force. IEEE Issue Date : 2001.*

* cited by examiner

METHOD AND SYSTEM REDUCING PEAK TO AVERAGE POWER RATIO (PAPR) IN A COMMUNICATION NETWORK

RELATED APPLICATION DATA

This application claims priority to and incorporates by reference application Ser. No. 60/700,767 filed on Jul. 19, 2005, titled Method to Reduce Peak-to-Average Ratio in OFDM Communications Systems

BACKGROUND OF THE INVENTION

The invention generally relates to a communication network. More specifically, the invention relates to reducing Peak to Average Power Ratio (PAPR) in an Orthogonal Frequency Division Multiplex (OFDM)/Orthogonal Frequency Division Multiplex Access (OFDMA) communication network.

In an OFDM/OFDMA communication network, certain combinations of OFDM symbols may result in signals with a large PAPR. One or more signals that have a large PAPR may get clipped in the RF Power Amplifier (PA). Therefore, the RF PA has to operate linearly for a wide range of amplitudes, such that, clipping of one or more signals that have a large PAPR is prevented. Moreover, the signals that have large PAPR saturate the RF PA and a transmitter, as a result of which, data in the OFDM/OFDMA communication network is lost. Additionally, transmitting the signals that have large PAPR reduces the power efficiency of the transmitter. A reduction in the power efficiency, further, reduces the battery life of mobile devices in the OFDM/OFDMA communication network. Examples of the mobile devices may include, but are not limited to, cell phones, and Personal Digital Assistants (PDA).

In conventional applications, PAPR of a plurality of OFDM symbols is reduced by digitally clipping one or more of OFDM symbols to a predetermined level before transmission. The digital clipping of the signals reduces unintentional clipping of one or more OFDM symbols in the RF PA before transmission. However, the digital clipping before transmission results in spectral spreading, which has to be filtered to decode the data carried by the plurality of OFDM symbols. Moreover, if EVM requirement of constellations of the plurality of OFDM symbols is considerably strong, then PAPR of the plurality of OFDM symbols is not reduced.

Further, in some conventional applications, a predefined set of tones in a plurality of OFDM symbols is reserved for carrying data. Thereafter, data transmitted on the predefined set of tones is decoded at a receiver, such that, PAPR of the plurality of OFDM symbols is reduced. However, decoding of data on the predefined set of tones is computationally complex.

In some conventional applications, constellation manipulation is used at a transmitter to reduce PAPR of a plurality of OFDM symbols. In constellation manipulation, for example, a phase of the plurality of OFDM symbols is modulated to reduce PAPR. The phase of the plurality of OFDM symbols is modulated using Partial Transmit Sequences (PTS) and Selective Mapping (SLM) methods. In these methods, a phase of sub-blocks of the plurality of OFDM symbols is modulated. Additionally, in these methods, a data frame of the plurality of OFDM symbols is multiplied with random vectors to reduce PAPR. However, in these methods, a receiver is required to know the type of constellation manipulation carried out at the transmitter. Further, the receiver has to violate one or more standard specifications in the OFDM/OFDMA communication network to know the type of constellation manipulation carried out in the transmitter.

Additionally, some conventional applications use codes to reduce PAPR of the plurality of OFDM symbols. Applications may use block-coding methods. In the block-coding method, a polyphase sequence that has small PAPR is transmitted for each OFDM symbol constellation. Block-coding method requires the use of large look-up tables for encoding and decoding of the plurality of OFDM symbols. Additionally, block-coding method requires an exhaustive search to identify one or more OFDM symbols that have poly-phase sequence with small PAPR. Further, conventional applications using codes detect one or more OFDM symbols that have less PAPR in an unstructured way.

Further, specific codes, for example, co-sets of Reed-Muller codes, may be used by some conventional applications to reduce PAPR of a plurality of OFDM symbols. However, the use of the specific code is limited to a small number of OFDM symbols.

There is therefore a need for a method and system that reduces PAPR of a plurality of OFDM symbols in a computationally efficient way, which is easy to implement. Further, the method and system should be independent of one or more of source coding, employed modulation, pilot sub-carrier insertion, and equalization methods used by a receiver in the OFDM/OFDMA communication network. Therefore, the method and system should be applicable to existing implementations and standard specifications. Additionally, the method and system should support multiple degrees of freedom, which can be employed to reduce the number of computations and/or processing load.

SUMMARY

An embodiment provides a method and system to reduce Peak to Average Power Ratio (PAPR) of a plurality of OFDM symbols.

Another embodiment provides a method and system in which the plurality of OFDM symbols, after modulation of one or more of the phase and the magnitude, have positive modulus in the frequency domain.

Yet another embodiment provides a method and system to reduce PAPR in each communication network in which channel estimation is done at the receiver using pilot sub-carriers.

Embodiments described below include methods and systems of transmitting a plurality of Orthogonal Frequency Division Multiple (OFDM) symbols in a block transmission system of a communication network. The block transmission system is a frequency reuse system for example but is not limited to a frequency reuse system. The methods include encoding the plurality of OFDM symbols. The methods further include, modulating at least one of a phase and a magnitude of the plurality of OFDM symbols. Thereafter, a plurality of modulated OFDM symbols is converted from a digital form to an analog form. The plurality of modulated OFDM symbols corresponds to the plurality of OFDM symbols.

BRIEF DESCRIPTION OF DRAWINGS

A more complete appreciation of the present invention is provided by reference to the following detailed description when considered in conjunction with the accompanying drawings in which reference symbols indicate the same or similar components, wherein.

DETAILED DESCRIPTION OF THE DRAWINGS

Various embodiments described herein provide methods and systems for reducing Peak to Average Power Ratio (PAPR) in an Orthogonal Frequency Division Multiplex (OFDM) communication network. It will be apparent to a person skilled in the art that the invention reduces PAPR in communication networks that make at least partial use OFDM tones.

Figure 1:
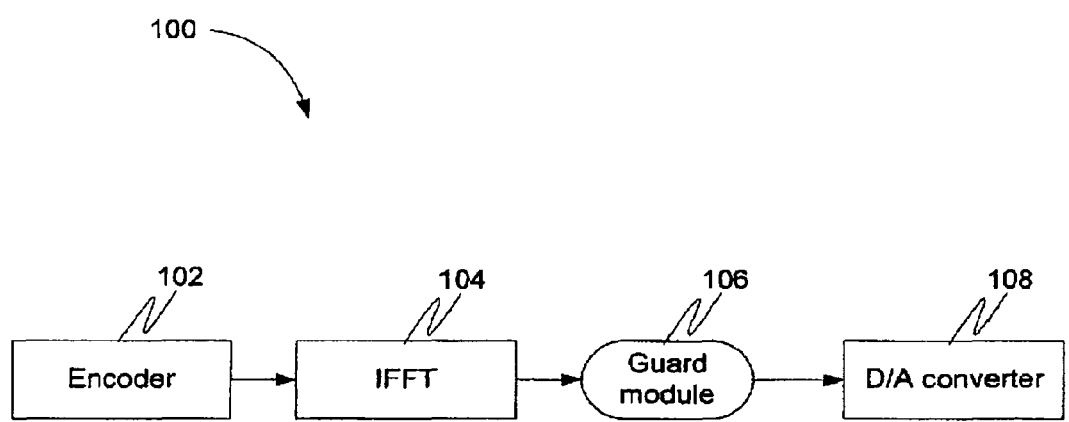
FIG. 1 is a block diagram showing an example environment in which various embodiments can function.

FIG. 1 is a block diagram showing an example environment 100 in which various embodiments function. Environment 100 includes an encoder 102, and an Inverse Fast Fourier Transform (IFFT) module 104, a guard module 106, and a Digital-to-Analog (D/A) converter 108. Encoder 102 converts the data that has to be transmitted to a plurality of OFDM symbols. The plurality of OFDM symbols is then converted from a frequency domain to a time domain by IFFT module 104. Thereafter, guard module 106 inserts a cyclic prefix to each OFDM symbol. The cyclic prefix is a guard interval in which the multi-path components of a symbol are absorbed to prevent the Inter Symbol Interference (ISI) in the plurality of OFDM symbols. The plurality of OFDM symbols is then converted from a digital form to an analog form by D/A converter 108. Thereafter, the plurality of OFDM symbols is transmitted.

Figure 2:
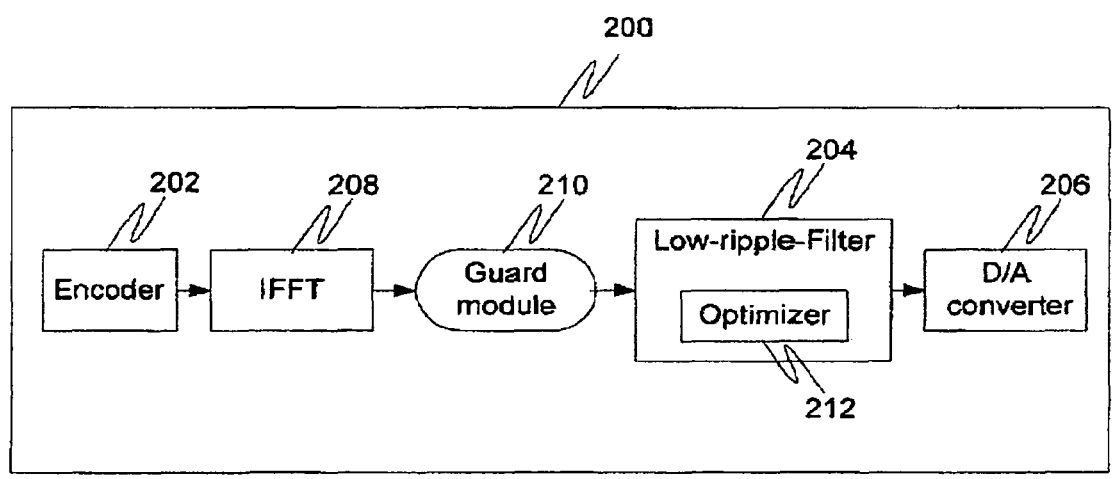
FIG. 2 is a block diagram showing various components of a transmitter for transmitting a plurality of Orthogonal Frequency Division Multiplex (OFDM) symbols in a block transmission system of a communication network, in accordance with an embodiment.

FIG. 2 is a block diagram showing various components of a transmitter 200 for transmitting a plurality of OFDM symbols, in accordance with an embodiment. Transmitter 200 transmits the plurality of OFDM symbols in a block transmission system of a communication network. The block transmission system is a frequency reuse system. Further, transmitter 200 is configured to transmit uplink signals. Additionally, transmitter 200 may be configured to transmit downlink signals.

Transmitter 200 includes an encoder 202, a low-ripple-filter 204 and a D/A converter 206. Encoder 202 encodes the plurality of OFDM symbols from the data that has to be transmitted. The plurality of OFDM symbols is then transformed from a frequency domain to a time domain by an IFFT module 208. Thereafter, a guard module 210 inserts a cyclic prefix to each OFDM symbol. The cyclic prefix has a length greater than maximum-delay-spread of each symbol to prevent ISI. After inserting the cyclic prefix, the plurality of OFDM symbols is then passed through low-ripple-filter 204.

Low-ripple-filter 204 modulates one or more of a phase and a magnitude of the plurality of OFDM symbols. Modulation of one or more of the phase and the magnitude reduces PAPR of the plurality of OFDM symbols. This is further explained in detail in conjunction with FIG. 4 below. A modulation in the magnitude of the plurality of OFDM symbols is captured by pilot sub-carriers inserted in the plurality of OFDM symbols. Therefore, the data being transmitted is not altered. Further, to modulate one or more of the phase and the magnitude, the plurality of OFDM symbols undergo point wise multiplication of tones with low-ripple-filter 204. Therefore, the phase and magnitude of each tone is modulated.

Further, low-ripple-filter 204 includes an optimizer 212. Optimizer 212 executes an optimization algorithm to modulate one or more of the phase and the magnitude of the plurality of OFDM symbols to generate a plurality of modulated OFDM symbols. This is further explained in detail in conjunction with FIG. 4 below. The plurality of modulated OFDM symbols has less PAPR as compared to the plurality of OFDM symbols. Further, the plurality of modulated OFDM symbols is generated in the time domain. The plurality of modulated OFDM symbols is modulated such that a conversion of the plurality of modulated OFDM symbols from the time domain to the frequency domain gives positive modulus. In an embodiment, positive modulus for the plurality of modulated OFDM symbols in the frequency domain is ensured by constraining the number of taps of low-ripple-filter 204, as the plurality of OFDM symbols undergo point wise multiplication of tones with low-ripple-filter 204. The number of taps of low-ripple-filter 204 is constrained such that low-ripple-filter 204 does not have spectral nulls and deep notches in the frequency domain. For example, low-ripple-filter 204 should not have any sinusoidal frequency that has zero frequency at one or more points. If low-ripple-filter 204 has a sinusoidal frequency and an OFDM symbol passes through low-ripple-filter 204, then at each point where the frequency of low-ripple-filter 204 is zero the data stored in the OFDM symbol will be lost.

In an embodiment, the number of taps of low-ripple-filter 204 is constrained to prevent ISI. The number of taps of low-ripple-filter 204 is constrained such that the sum of the number of taps and a maximum-delay-spread of each OFDM symbol does not exceed the cyclic prefix inserted by guard module 210.

Figure 3:
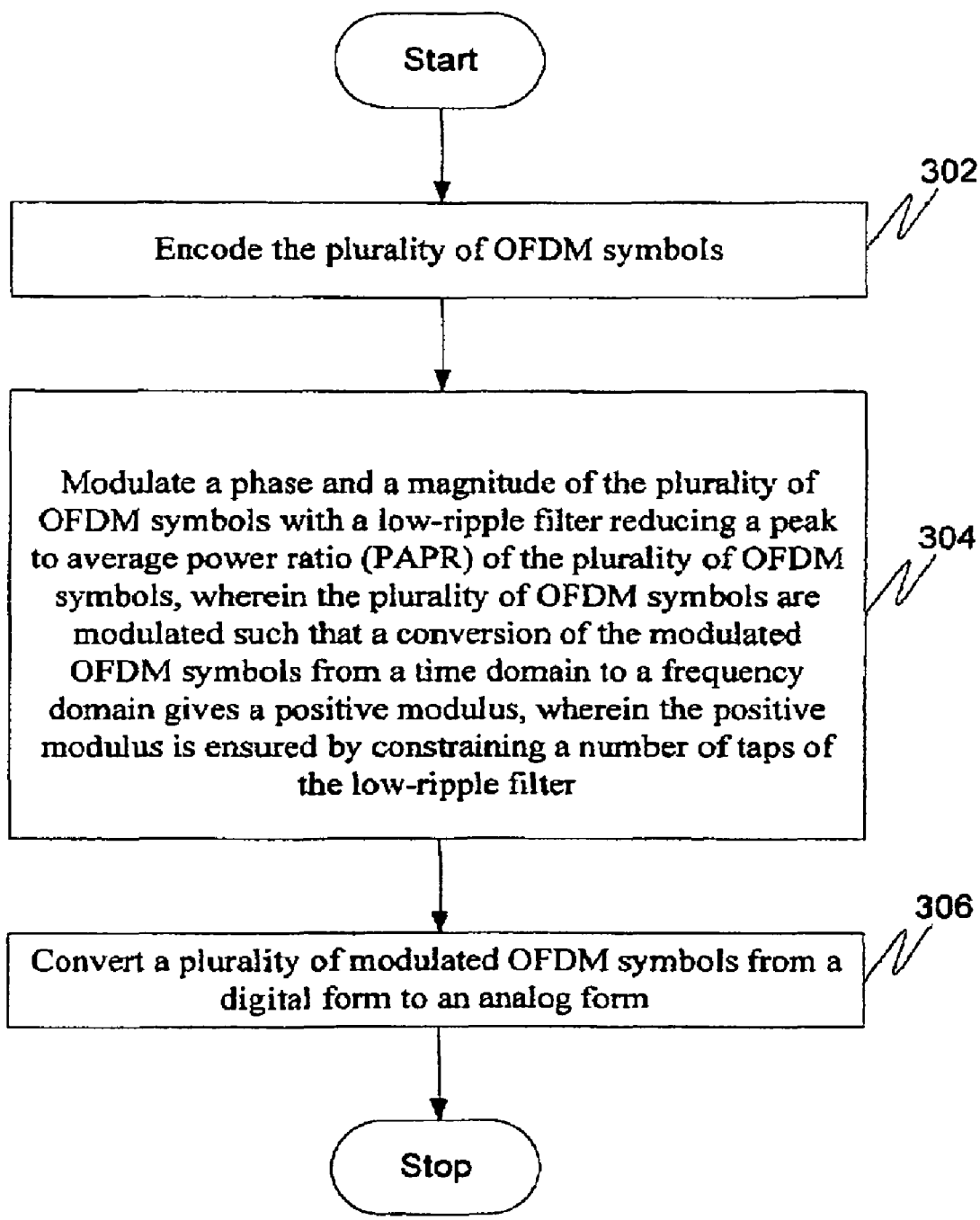
FIG. 3 is a flowchart for transmitting a plurality of OFDM symbols in a block transmission system of a communication network, in accordance with an embodiment.

FIG. 3 is a flowchart for transmitting a plurality of OFDM symbols in a block transmission system of a communication network, in accordance with an embodiment. In another embodiment, a plurality of Orthogonal Frequency Division Multiplex Access (OFDMA) symbols is transmitted in the block transmission system of the communication network. The block transmission system is a frequency reuse system. The block transmission system may be a frequency reuse-1 system. Further, the communication network may be a Multiple Input Multiple Output (MIMO) communication network.

At 302, the plurality of OFDM symbols is encoded by encoder 202. The data, which has to be transmitted, is converted to the plurality of OFDM symbols. The encoding is further explained in detail in conjunction with FIG. 5 below. Thereafter, at 304 a phase and a magnitude of the plurality of OFDM symbols is modulated by low-ripple-filter 204. An optimization algorithm is used to modulate the phase and the magnitude of the plurality of OFDM symbols, such that, PAPR of the plurality of OFDM symbols is reduced. This is further explained in conjunction with FIG. 4 below. After modulating the phase and magnitude of the plurality of OFDM symbols, a plurality of modulated OFDM symbols are converted from a digital form to an analog form by D/A converter 206, at 306. The plurality of modulated OFDM symbols corresponds to the plurality of OFDM symbols.

Figure 4:
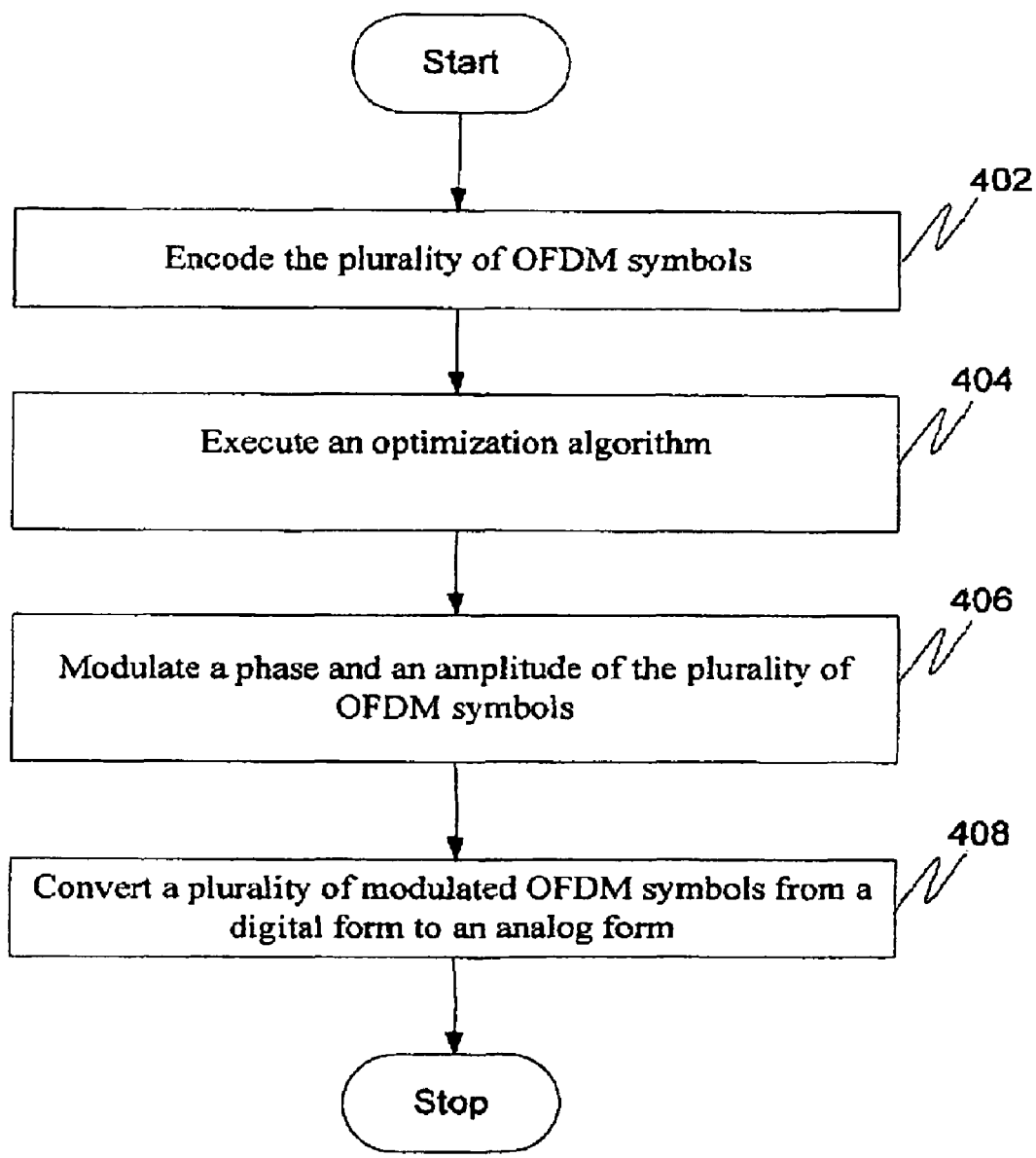
FIG. 4 is a flowchart for transmitting a plurality of OFDM symbols in a block transmission system of a communication network, in accordance with another embodiment.

FIG. 4 is a flowchart for transmitting a plurality of OFDM symbols in a block transmission system of a communication network, in accordance with another embodiment. At 402, the plurality of OFDM symbols is encoded by encoder 202. The encoding is further explained in detail in conjunction with FIG. 5 below. After encoding the plurality of OFDM symbols, an optimization algorithm is executed by optimizer 212, at 404. Thereafter, at 406, one or more of the phase and the magnitude of the plurality of OFDM symbols is modulated by low-ripple-filter 204 using the optimization algorithm. The optimization algorithm modulates one or more of the phase and the magnitude of the plurality of OFDM symbols to generate the plurality of modulated OFDM symbols. The plurality of modulated OFDM symbols has less PAPR as compared to the plurality of OFDM symbols. The plurality of modulated OFDM symbols is generated in the time domain. Further, converting the plurality of modulated OFDM symbols from the time domain to the frequency domain gives positive modulus.

In an example embodiment, optimizer 212 executes an optimization algorithm to solve the optimization problem given by equation 1 below, which modulates one or more of a phase and a magnitude of OFDM symbol x:

$$\min_g \max_k |(x \otimes g)(k)| \; k = 0, \ldots, n-1; \quad \text{(Equation 1)}$$

$$\text{subject to } \sum_{k=0}^{k-1} |g(k)| \leq \alpha$$

$$g = [g(0), g(1), \ldots, g(k-1), 0, \ldots, 0]$$

where,
n is the number of taps of low-ripple-filter 204;
g is low-ripple-filter 204;
α is a predetermined positive number.

The optimization problem given by equation 1 can be solved by using convex optimization solvers. Examples of the convex optimization solvers may include, but are not limited to, interior point methods.

In another example embodiment, optimizer 212 executes an optimization algorithm to solve an optimization problem given by equation 2 below, which modulates one or more of a phase and a magnitude of the OFDM symbol x:

$$\min_g \max_k |(x \otimes g)(k)| \; k = 0, \ldots, n-1; \quad \text{(Equation 2)}$$

$$\text{subject to } |g(0) - 1| \leq \varepsilon$$

$$\sum_{k=0}^{k-1} |g(k)| \leq \alpha$$

where,
n is the number of taps of low-ripple-filter 204;
g is low-ripple-filter 204;
ϵ is a predetermined positive number; and
α ≦ 1−2ϵ.

A solution of the optimization problem given by equation 2 provides positive modulus for the plurality of modulated OFDM symbols in the frequency domain. The optimization problem given by equation 2 can be solved using constrained-optimization algorithms in the art. A global-constrained-optimization algorithm will yield a global optimum as a solution for the optimization problem. The global optimum is the best possible solution for the optimization problem. Further, the global optimum reduces PAPR most effectively. Additionally, a local-constrained-optimization algorithm will yield a local optimum as a solution for the optimization problem. The local optimum is more effective in reducing PAPR as compared to a plurality of solutions for the optimization problem. Additionally, the local optimum is less effective in reducing PAPR as compared to the global optimum.

In another example embodiment, a plurality of prototypes of low-ripple-filter 204 are computed using equation 3 as:

$$\{g_m\}_{m=1}^M \quad \text{(Equation 3)}$$

$$g_m = \lfloor 1, \alpha e^{j2\pi k/M}, 0 \ldots, 0 \rfloor$$

where,
g is low-ripple-filter 204;
M is the total number of prototypes of low-ripple-filter 204;
α is a positive number less than one.

Each OFDM symbol is passed through the plurality of prototypes of low-ripple-filter 204. Thereafter, a prototype of low-ripple-filter 204 that gives the least PAPR is used to generate the plurality of modulated OFDM symbols. Further, as α is a positive number less than one, therefore, low-ripple-filter 204 has positive modulus in the frequency domain. As a result, the plurality of modulated OFDM symbols has positive modulus in the frequency domain. An exemplary value of α, i.e., 0.75 produces a plurality of prototypes of low-ripple-filter 204 that gives efficient PAPR reduction for the plurality of OFDM symbols.

In another exemplary embodiment, each OFDM symbol is passed through the total number of prototypes of low-ripple-filter 204, i.e., M. Thereafter, a prototype of low-ripple-filter 204 that gives the least PAPR is selected for each OFDM symbol.

In another example embodiment, a user is assigned a predefined set of tones in the plurality of OFDM symbols. In this exemplary embodiment, low-ripple-filter 204 modulates the phase and the magnitude of the plurality of OFDM symbols, such that, only the tones in the predefined set of tones, which carry data of the user have positive modulus in frequency domain. In an embodiment, after one or more of the phase and the magnitude of the plurality of OFDM symbols have been modulated, tones in the predefined set of tones, which do not carry data of the user may have spectral nulls in the frequency domain.

After the optimization algorithm is executed by optimizer 212, the plurality of modulated symbols is converted form a digital form to an analog form by D/A converter 206, at 408.

Figure 5:
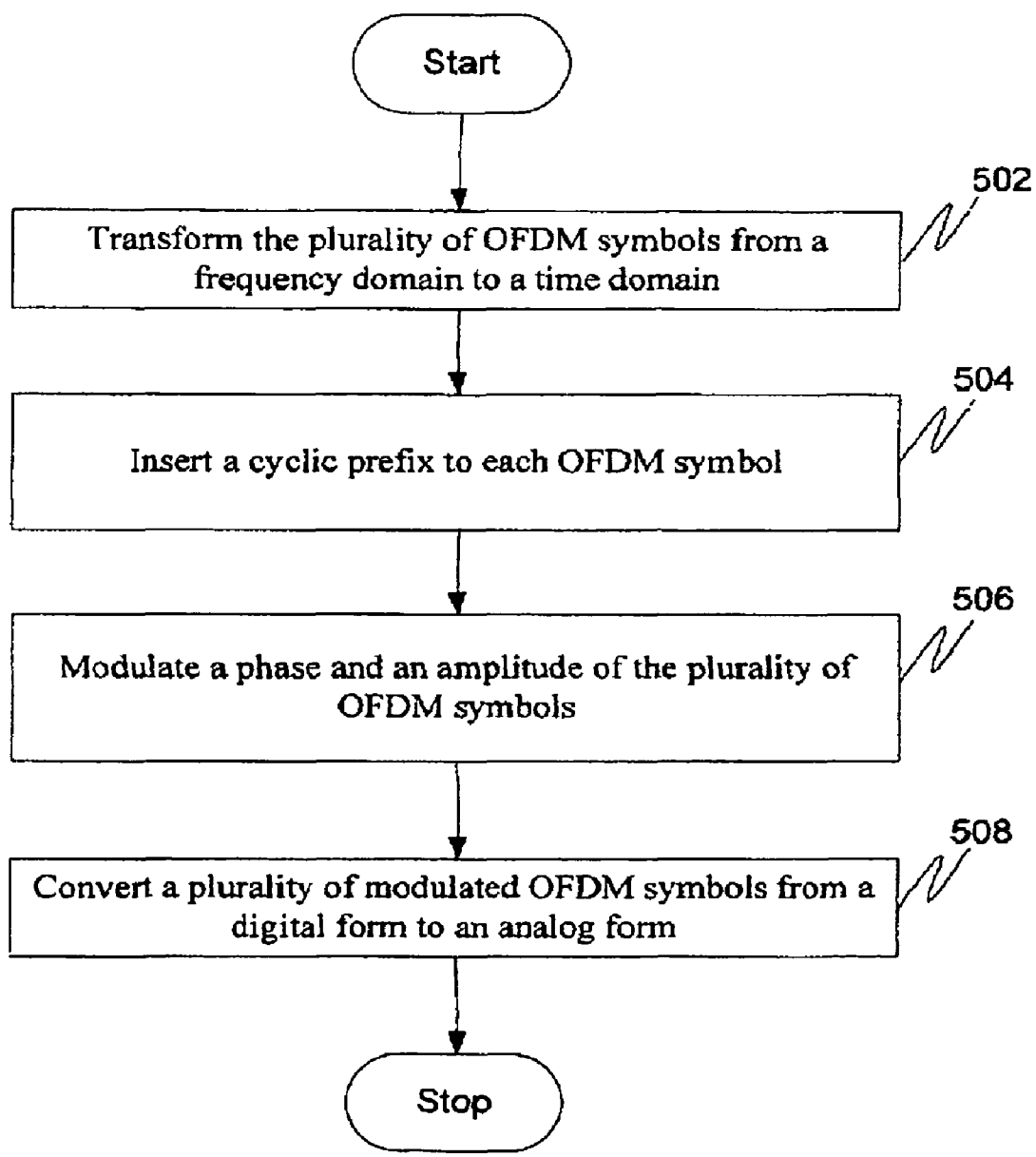
FIG. 5 is a flowchart for encoding the plurality of OFDM symbols in a block transmission system of a communication network, in accordance with an embodiment.

FIG. 5 is a flowchart for encoding the plurality of OFDM symbols in a block transmission system of a communication network, in accordance with another embodiment. At 502, the plurality of OFDM symbols is transformed from a frequency domain to a time domain by IFFT module 208. Thereafter, at 504, a cyclic prefix is inserted to each OFDM symbol in the time domain by guard module 210. The length of the cyclic prefix is larger than maximum-delay-spread of each symbol. After inserting the cyclic prefix, at 506, one or more of the phase and the magnitude of the plurality of OFDM symbols is modified by low-ripple-filter 204. This has been explained in detail in conjunction with FIG. 3 and FIG. 4 above. Thereafter, at 508, a plurality of modulated OFDM symbols is converted from a digital form to an analog form by D/A converter 206. The plurality of modulated OFDM symbols corresponds to the plurality of OFDM symbols.

Figure 6:
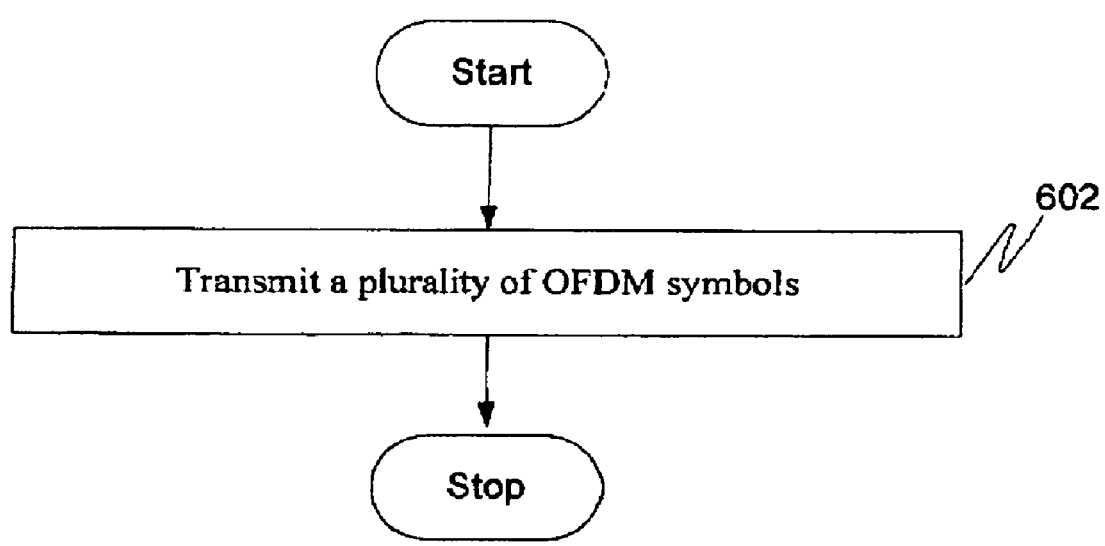
FIG. 6 is a flowchart for reducing Peak to Average Power Ratio (PAPR) of a plurality of OFDM symbols in a block transmission system of a communication network, in accordance with an embodiment.

FIG. 6 is a flowchart for reducing Peak to Average Power Ratio (PAPR) of the plurality of OFDM symbols in a block transmission system of a communication network, in accordance with an embodiment. The block transmission system is a frequency reuse system. At 602, the plurality of OFDM symbols is transmitted in the block transmission system of the communication network. A transmitter is configured to transmit the plurality of OFDM symbols using encoder 202 to encode the plurality of OFDM symbols. Thereafter, one or more of the phase and the magnitude of the plurality of OFDM symbols is modulated by low-ripple-filter 204. After modulating one or more of the phase and the magnitude, a plurality of modulated OFDM symbols are converted from a digital form to an analog form by D/A converter 206. The plurality of modulated OFDM symbols corresponds to the plurality of OFDM symbols. The method of transmitting has been explained in detail in conjunction with FIG. 3 and FIG. 4 above.

Various embodiments of the invention provide methods and systems to reduce PAPR of the plurality of OFDM symbols. Further, reduction of PAPR of the plurality of OFDM symbols does not reduce data rate and the error correction capabilities of the plurality of OFDM symbols. Additionally, the plurality of OFDM symbols, after modulation of one or more of the phase and the magnitude, has positive modulus in the frequency domain. Further, a receiver in the communication network does not require any modification to decode the plurality of modulated OFDM symbols. Additionally, the receiver does not require data to encode the plurality of OFDM symbols.

Further, various embodiments of the invention provide methods and systems that can be used in conjunction with other PAPR reduction methods. Additionally, PAPR can be reduced in each communication network in which receiver estimates channel using pilot sub-carriers.

What is claimed is:

1. A method of transmitting a plurality of Orthogonal Frequency Division Multiple (OFDM) symbols in a block transmission system of a communication network, the block transmission system being a frequency reuse system, the method comprising:
  a. encoding the plurality of OFDM symbols;
  b. modulating a phase and a magnitude of the plurality of OFDM symbols with a low-ripple filter reducing a peak to average power ratio (PAPR) of the plurality of OFDM symbols, wherein the plurality of OFDM symbols are modulated such that a conversion of the modulated OFDM symbols from a time domain to a frequency domain gives a positive modulus, wherein the positive modulus is ensured by constraining a number of taps of the low-ripple filter; and
  c. converting a plurality of modulated OFDM symbols from a digital form to an analog form, wherein the plurality of modulated OFDM symbols correspond to the plurality of OFDM symbols.

2. The method of claim 1, wherein encoding comprises:
  a. transforming the plurality of OFDM symbols from a frequency domain to a time domain; and
  b. inserting a cyclic prefix to each OFDM symbol in the time domain.

3. The method of claim 2, wherein modulating comprises executing an optimization algorithm, wherein the optimization algorithm modulates the phase and the magnitude of the plurality of OFDM symbols to generate the plurality of modulated OFDM symbols, wherein the plurality of modulated OFDM symbols are generated in the time domain.

4. The method of claim 3, wherein converting the plurality of modulated OFDM symbols from the time domain to the frequency domain gives positive modulus.

5. The method of claim 1, wherein the block transmission system is a frequency reuse-1 system.

6. The method of claim 1, wherein a plurality of Orthogonal Frequency Division Multiple Access (OFDMA) symbols are transmitted in the block transmission system.

7. The method of claim 1, wherein the communications network is a Multiple Input Multiple Output (MIMO) communication network.

8. A transmitter for transmitting a plurality of Orthogonal Frequency Division Multiplex (OFDM) symbols in a block transmission system of a communication network, the block transmission system being a frequency reuse system, the transmitter comprising:
  a. an encoder, wherein the encoder encodes the plurality of OFDM symbols;
  b. a low-ripple filter, wherein the low-ripple filter modulates a phase and a magnitude of the plurality of OFDM symbols reducing a peak to average power ratio (PAPR) of the plurality of OFDM symbols, wherein the plurality of OFDM symbols are modulated such that a conversion of the modulated OFDM symbols from a time domain to a frequency domain gives a positive modulus, wherein the positive modulus is ensured by constraining a number of taps of the low-ripple filter; and
  c. a Digital-to-Analog (DA) converter, wherein the DA converter converts a plurality of modulated OFDM symbols from a digital form to an analog form, wherein the plurality of modulated OFDM symbols correspond to the plurality of OFDM symbols.

9. The transmitter of claim 8 further comprising:
  a. an Inverse Fast Fourier Transform (IFFT) module, wherein the IFFT module transforms the plurality of OFDM symbols from a frequency domain to a time domain; and
  b. a guard module, wherein the guard module inserts a cyclic prefix to each OFDM symbol in the time domain.

10. The transmitter of claim 9, wherein the low-ripple filter comprises an optimizer, wherein the optimizer executes an optimization algorithm to modulate the phase and the magnitude of the plurality of OFDM symbols to generate the plurality of modulated OFDM symbols, the plurality of modulated OFDM symbols are generated in the time domain.

11. The transmitter of claim 8, wherein the transmitter is configured to transmit uplink signals.

12. The transmitter of claim 8, wherein the transmitter is configured to transmit downlink signals.

* * * * *